(12) United States Patent
Chen

(10) Patent No.: US 7,155,780 B2
(45) Date of Patent: Jan. 2, 2007

(54) HINGE ASSEMBLY FOR FOLDABLE ELECTRONIC DEVICE

(75) Inventor: Rui Hao Chen, Tu-Chen (TW)

(73) Assignee: Sutech Trading Limited, Tortola (VG)

( * ) Notice: Subject to any disclaimer, the term of this patent is extended or adjusted under 35 U.S.C. 154(b) by 0 days.

(21) Appl. No.: 10/920,760

(22) Filed: Aug. 17, 2004

(65) Prior Publication Data

US 2005/0097705 A1 May 12, 2005

(30) Foreign Application Priority Data

Nov. 7, 2003 (TW) ............................. 92219767 U

(51) Int. Cl.
*E05F 1/08* (2006.01)
*E05D 11/10* (2006.01)
(52) U.S. Cl. .......................... 16/326; 16/330
(58) Field of Classification Search .......... 16/326–328, 16/333, 337, 340–342, 350, 351, 242, 255, 16/277, 284, 330; 379/433.11–433.13, 433, 379/428; 361/681–683, 803; 455/90, 550, 455/556, 575; 403/119, 120
See application file for complete search history.

(56) References Cited

U.S. PATENT DOCUMENTS

| | | | |
|---|---|---|---|
| 5,109,571 A * | 5/1992 | Ohshima et al. ............... 16/307 |
| 5,628,089 A | 5/1997 | Wilcox et al. |
| 5,799,371 A * | 9/1998 | Lin ............................... 16/330 |
| 6,148,480 A * | 11/2000 | Cooke .......................... 16/303 |
| 6,175,990 B1 * | 1/2001 | Kato et al. ..................... 16/334 |
| 6,459,887 B1 * | 10/2002 | Okuda ......................... 455/90.1 |
| 6,633,643 B1 * | 10/2003 | Ona ........................ 379/433.13 |
| 6,658,699 B1 * | 12/2003 | Huong ......................... 16/330 |
| 6,708,046 B1 * | 3/2004 | Takagi ....................... 455/575.3 |
| 6,789,292 B1 * | 9/2004 | Oshima et al. ................ 16/297 |
| 6,829,807 B1 * | 12/2004 | Kim .............................. 16/322 |
| 6,886,221 B1 * | 5/2005 | Minami et al. ................ 16/324 |
| 2005/0026659 A1 * | 2/2005 | Yang ....................... 455/575.3 |

* cited by examiner

*Primary Examiner*—Robert J. Sandy
*Assistant Examiner*—Andre' L. Jackson
(74) *Attorney, Agent, or Firm*—Wei Te Chung

(57) ABSTRACT

A hinge assembly (10) for joining a body and a cover of a mobile phone includes an inner housing (100), a key (110), a pressure spring (120), a can (130), a slider (140), a damper (150), an outer housing (160), a fastener (170), and a torsion-bar spring (190). The can includes an acceptor (132) defining an axial slot (132b) in a peripheral wall thereof, and a protrusion (131) having a stepped hole. The slider has an adjoining block (141) received in the stepped hole. One end of the torsion-bar spring is secured onto the fastener, and the other end of the torsion-bar spring is received in the slot. A user presses the key to slidably remove the slider from the stepped hole of the can, whereupon the torsion-bar spring can rotationally drive the slider and the fastener, with the outer housing turning in unison therewith. Thus the cover is opened.

20 Claims, 7 Drawing Sheets

HINGE ASSEMBLY FOR FOLDABLE ELECTRONIC DEVICE

BACKGROUND OF THE INVENTION

1. Field of the Invention

The present invention relates to hinge assemblies used in electronic devices, and particularly to a hinge assembly for hinging a cover and a housing of a foldable electronic device together. The instant invention relates to a contemporarily filed application titled "HINGE FOR A PORTABLE ELECTRONIC DEVICE" and having the same assignee with the instant application.

2. Prior Art

Portable electronic devices, such as cellular phones and PDAs (personal digital assistants), are becoming ever more popular with the development of wireless communication technology and data processing technology.

For example, a foldable cellular phone commonly has two housings joined by some type of hinge that allows the housings to fold upon one another. Some foldable phones have most of the electronics provided in one of the housings, called the body. The other housing, called the cover, normally contains fewer electronic components than the body. Other foldable phones have essentially all the electronics provided in the body, with the cover serving only to cover and protect the keypad and the display of the phone.

U.S. Pat. No. 5,628,089, issued to Wilcox et al and entitled "Radiotelephone Having a Self Contained Hinge," discloses a hinge for use in a miniaturized radiotelephone. This hinge is represented in FIG. 6. The hinge 20 comprises a spring 22, a cam 23 and a follower 24 assembled into a cylindrically hollow can 21 via an open end thereof, and held in assemblage by a cap 25 coupled to the can 21 over the open end. The hinge 20 can be attached in a cavity of a cover and a cavity of a body of the radiotelephone.

This kind of self contained hinge is desired by some cellular phone manufacturers because it can be purchased as a separate unit, thereby eliminating the steps associated with assembling such hinge during manufacturing. However, a foldable cellular phone with such hinge can be opened automatically only after the cover has first been turned about the body by a user. It is not easy for the user to open the cellular phone with only one hand, for example when the user is driving a car or is otherwise occupied. Furthermore, the cover is prone to open quickly and jar against the body. After much use, the body and the cover are liable become worn out and not operate properly.

Thus, a need exists for a convenient and highly reliable hinge assembly which is suitable for use in a foldable electronic device, and which overcomes the above-described problems.

SUMMARY OF THE INVENTION

An object of the present invention is to provide a hinge assembly for a foldable cellular phone, the hinge assembly being highly reliable and operable with a simple key or button.

Another object of the present invention is to provide a cover of a foldable electronic device, the cover having high reliability and being openable with a simple key or button.

To accomplish the above-mentioned objects, the present invention provides a hinge assembly for joining a body and a cover of a foldable mobile phone. The hinge assembly includes an inner housing, a key, a pressure spring, a can, a slider, a damper, an outer housing, a fastener, an orientation pin, and a torsion-bar spring. The can includes an acceptor that defines an axial slot in a peripheral wall thereof, and a protrusion having a stepped hole in a middle thereof. The slider has an adjoining block received in the stepped hole. One end of the torsion-bar spring is secured onto the fastener, and the other end of the torsion-bar spring is received in the slot of the can. The damper is disposed between the inner housing and the outer housing. A user presses the key to slidably remove the block of the slider from the stepped hole of the can, whereupon the torsion-bar spring can rotationally drive the slider and the fastener, with the outer housing turning in unison therewith. Thus the cover is opened.

The hinge assembly of the invention enables a foldable cellular phone to be opened by pressing a single key. Users can operate the phone more conveniently without having to use both hands. The damper is disposed between the outer housing and the inner housing of the hinge assembly. This can minimize any jarring of the cover that might otherwise occur, and minimizes inner abrasion of the hinge assembly.

Other objects, advantages and novel features of the invention will be drawn from the following detailed description with reference to the attached drawings, in which:

DETAILED DESCRIPTION OF THE PREFERRED EMBODIMENT

Figure 1:
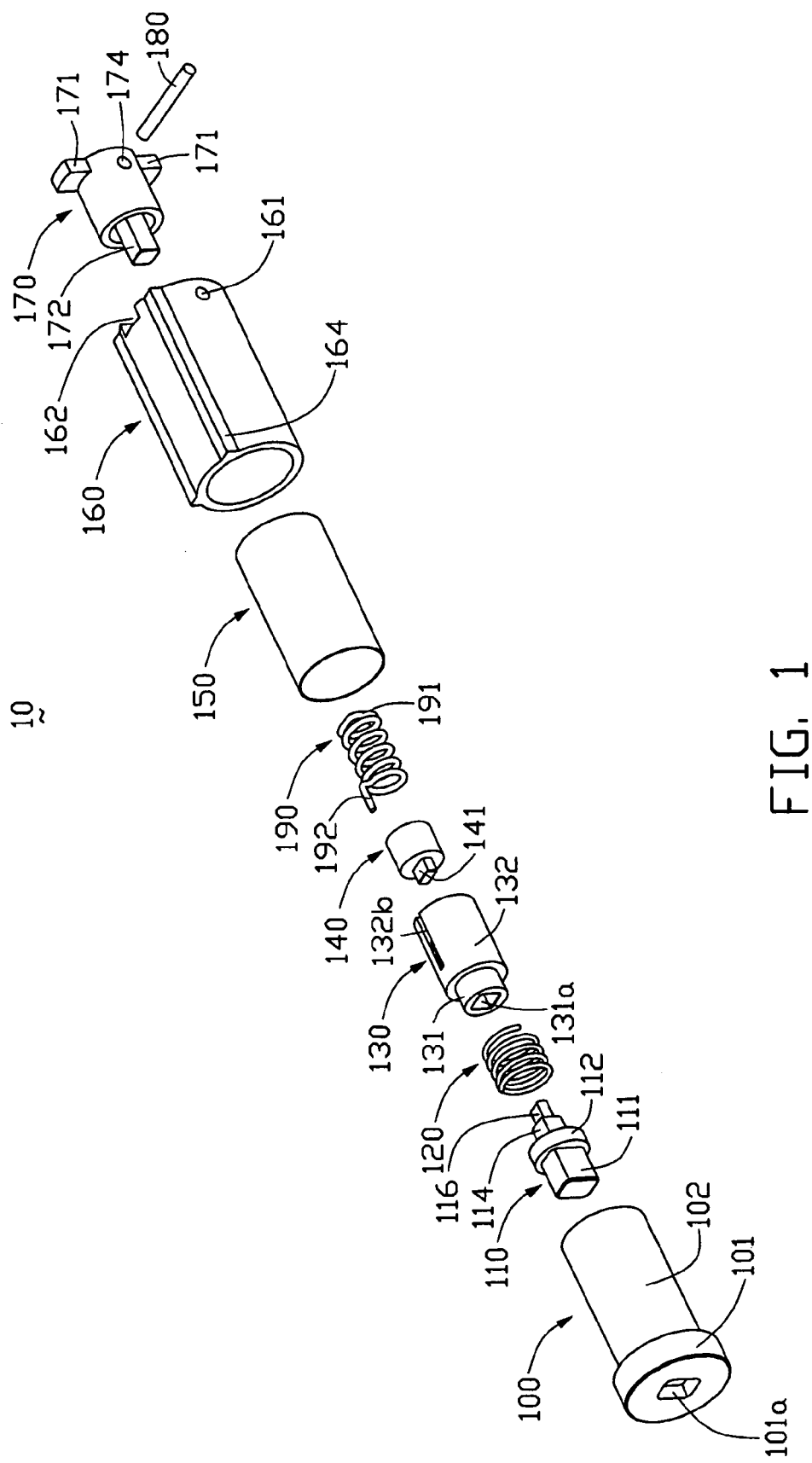
FIG. 1 is an exploded, isometric view of a hinge assembly for a cellular phone in accordance with the present invention.
Figure 2:
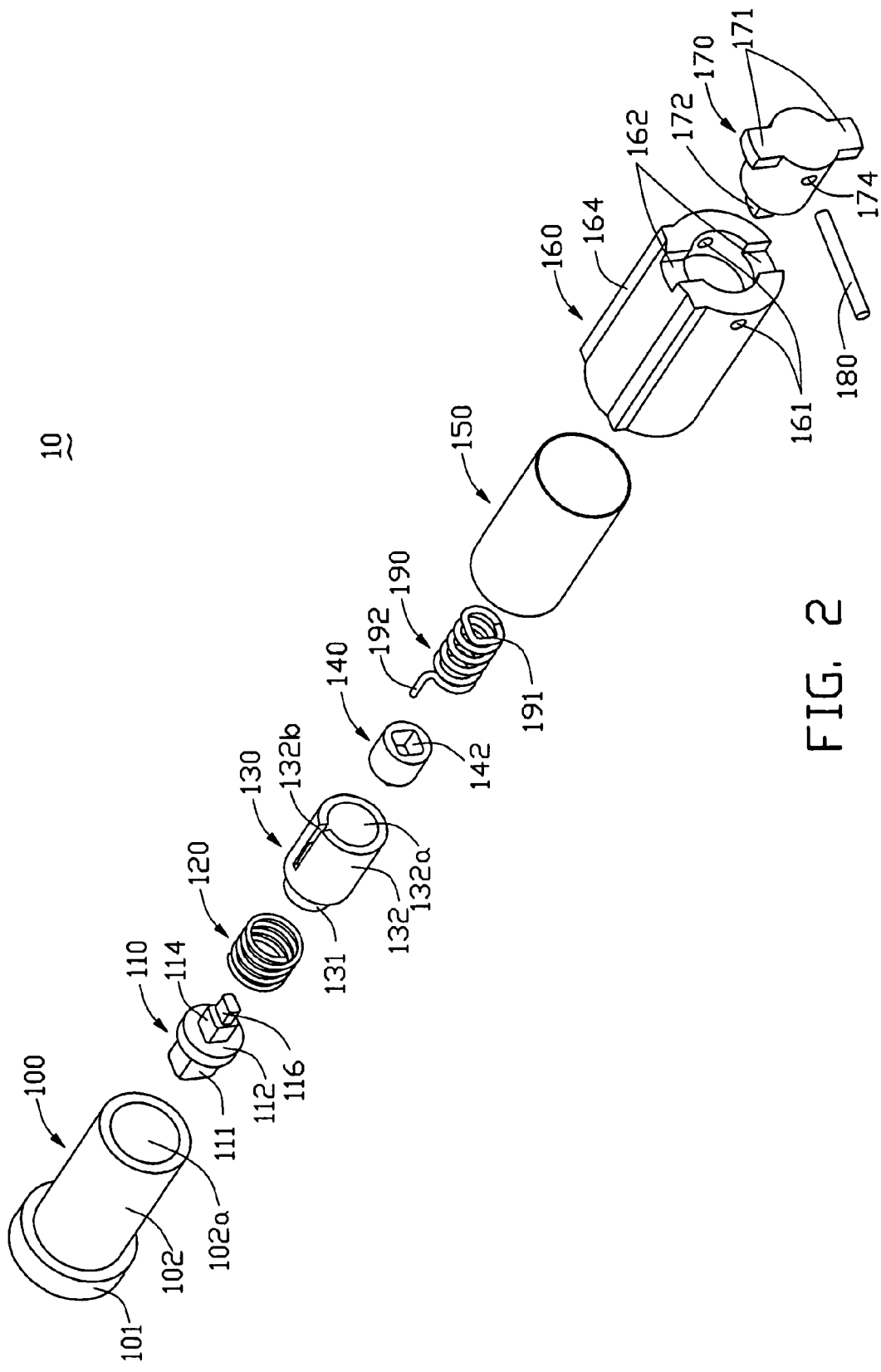
FIG. 2 is similar to FIG. 1, but viewed from another aspect.

An exemplary embodiment of a hinge assembly in accordance with the present invention is shown in FIGS. 1 and 2. The hinge assembly 10 includes an inner housing 100, a key 110, a pressure spring 120, a can 130, a slider 140, a damper 150, an outer housing 160, a fastener 170, an orientation pin 180, and a torsion-bar spring 190.

The inner housing 100 includes a head 101 and a neck 102, both of which are cylindrical and share a same axis. The head 101 is attached in a body of a cellular phone. A square setting hole 101a is defined in a middle of the head 101. The setting hole 101a is a through hole, and is for engagingly receiving the key 110. An inside of the neck 102 defines an accepting space 102a, which can accept the key 110, the pressure spring 120 and the can 130 in turn.

The key 110 is a step-like column which includes a pressing portion 111, a cylindrical portion 112, a step 114 and a driving peg 116. The pressing portion 111 is generally cubical, and is shaped to be fittingly received in the setting hole 101a.

The pressure spring 120 is helical. One end of the pressure spring 120 surrounds the step 114 and the driving peg 116 and abuts against the cylindrical portion 112 of the key 110. An opposite end of the pressure spring 120 engages with the can 130.

The can 130 includes an acceptor 132 and a protrusion 131, both of which are cylindrical and share a same axis. The protrusion 131 defines a stepped hole in a middle thereof, the stepped hole comprising a first chamber 131a and a second chamber 131b (shown in FIG. 3). The two chambers 131a, 131b share a same axis, and a radius of the first chamber 131a is greater than that of the second chamber 131b. The first chamber 131a is shaped to fittingly receive the step 114 of the key 110. The second chamber 131b is shaped to movably receive the driving peg 116 of the key 110. The driving peg 116 can slide along the axis of the second chamber 131b. A cavity 132a is defined inside the acceptor 132, and an axial slot 132b is defined in a peripheral wall of the acceptor 132. An open end of the axial slot 132b runs through the peripheral wall of the acceptor 132, while an opposite closed end of the axial slot 132b does not. That is, the closed end of the axial slot 132b is only defined in an outside portion of the peripheral wall. An external radius of the acceptor 132 is slightly less than a radius of the accepting space 102a of the neck 102 of the inner housing 100.

The slider 140 includes a cylindrical main body (not labeled) and an adjoining block 141. The block 141 has a rectangular cross section, and is shaped to be fittingly received in the second chamber 131b of the protrusion 131. The main body defines a generally rectangular hole 142 therein. When the driving peg 116 drives the block 141, the slider 140 is pushed to axially slide in the cavity 132a of the can 130.

The damper 150 is made from glue-like material that cannot become hardened, or is dampening oil. The damper 150 is disposed between the inner housing 100 and the outer housing 160, to increase friction when the two housings 100, 160 move relative to each other. This can to some degree decrease the speed of rotation when a cover of the cellular phone rotates relative to a body thereof.

The outer housing 160 is a hollow cylinder connectable with the cover of the cellular phone. The outer housing 160 includes two orientation holes 161, two cutouts 162, and two parallel ribs 164 that connect the outer housing 160 and the cover. The orientation holes 161 are symmetrically defined in a peripheral wall of the outer housing 160. The cutouts 162 are symmetrically defined in one end of the outer housing 160. An internal radius of the outer housing 160 is slightly greater than an external radius of the inner housing 100.

The fastener 170 is generally a hollow cylinder with one closed end. The fastener 170 includes a pair of orientation arms 171, an axial pole 172, and two limiting holes 174. The orientation arms 171 are symmetrically opposite each other, and radially extend from the closed end of the fastener 170. The orientation arms 171 can be coupled in the cutouts 162 of the outer housing 160. The axial pole 172 extends from an inside of the closed end through a middle of the fastener 170, and protrudes out from an opposite open end of the fastener 170. The axial pole 172 is shaped to be fittingly received in the rectangular hole 142 of the slider 140. The limiting holes 174 are defined symmetrically in a peripheral wall of the fastener 170.

The orientation pin 180 is for extending through the orientation holes 161 and the limiting holes 174 in order to secure the fastener 170 in the outer housing 160. The orientation pin 180 can alternatively be replaced by other suitable securing means such as pegs or dowels.

The torsion-bar spring 190 is generally helical, and has a first end 191 and an opposite second end 192. The first end 191 is generally rectangular, so that it can be fixed around the axial pole 172 inside the fastener 170. The first end 191 is thus secured with the fastener 170. The second end 192 is coupled in the axial slot 132b of the can 130, such that it can axially slide in the axial slot 132b.

Figure 3:
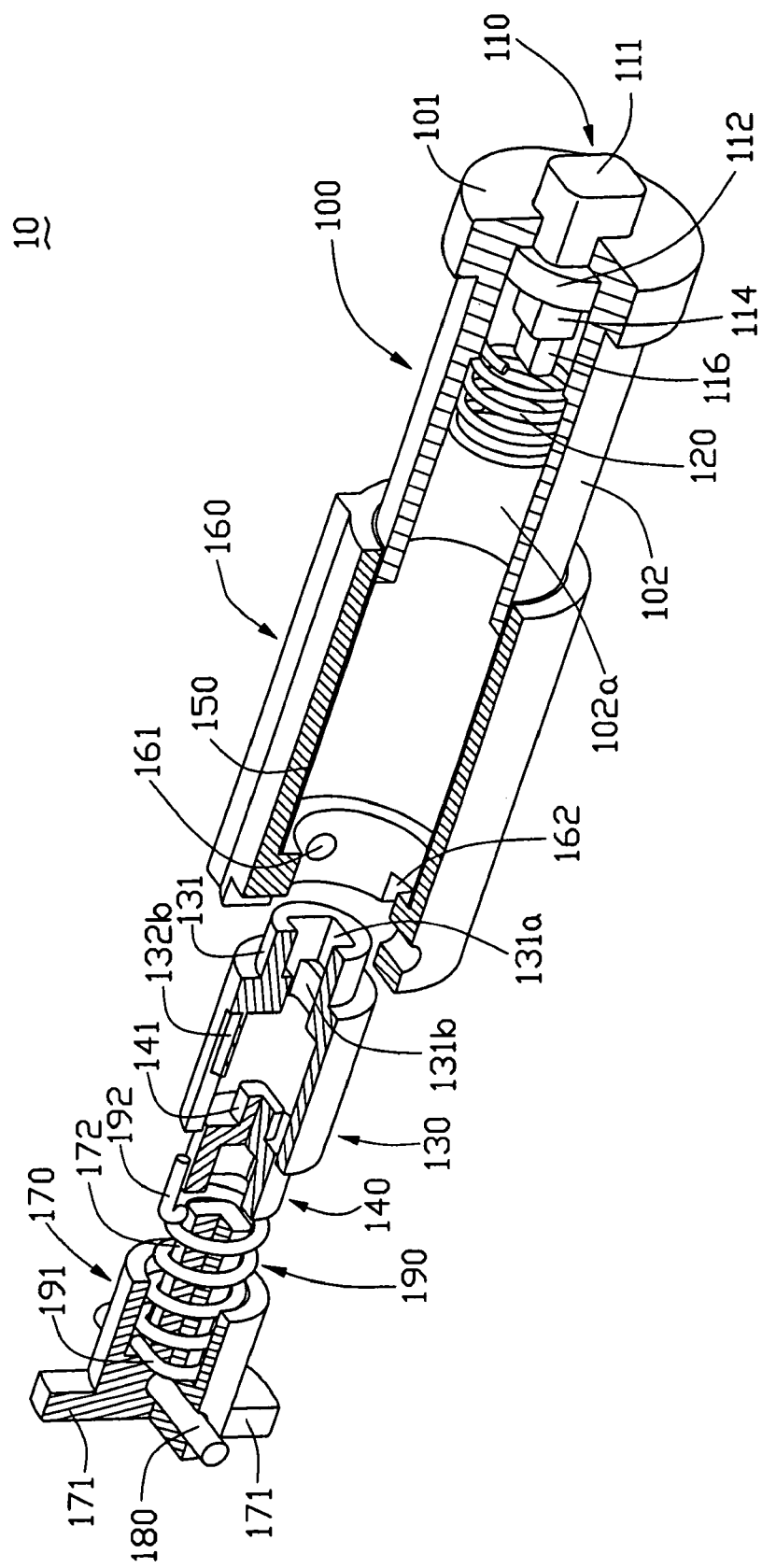
FIG. 3 is a partly assembled, cut-away view of the hinge assembly of FIG. 1, but viewed from another aspect.

As shown in FIG. 3, when the hinge assembly 10 is assembled, if the damper 150 is solid, the damper 150 is attached to an internal surface of the outer housing 160. The key 110 and then the pressure spring 120 are inserted into the accepting space 102a of the inner housing 100. The pressing portion 111 protrudes out from the setting hole 101a of the head 101. One end of the pressure spring 120 is received around the step 114 and the driving peg 116 of the key 110, and abuts against the cylindrical portion 112. The first end 191 of the torsion-bar spring 190 is secured around the axial pole 172 of the fastener 170. The slider 140 and the fastener 170 with the torsion-bar spring 190 are received in turn into the cavity 132a of the can 130. The torsion-bar spring 190 is simultaneously turned so that the second end 192 is received in the axial slot 132b of the can 130. The assembled can 130 is disposed inside the inner housing 100. The other end of the pressure spring 120 is placed around the protrusion 131 of the can 130, and abuts against an outer stepped surface of the acceptor 132. The driving peg 116 of the key 110 extends into the second chamber 131b of the protrusion 131, and pushes the block 141 of the slider 140 to axially slide in the cavity 132a of the can 130. The orientation pin 180 is threaded through the orientation holes 161 and the limiting holes 174 to attach the outer housing 160 and the fastener 170 together. Thus assembly of the hinge assembly 10 is achieved.

If the damper 150 is dampening oil, after the inner housing 11 accommodates the key 110, the pressure spring 120, the can 130 and the slider 140, the exterior surface of the neck 102 of the inner housing 110 is coated with the damper oil. Then the outer housing 160 is received over the neck 102. The orientation pin 180 is threaded through the orientation holes 161 and the limiting holes 174 to achieve the assembled hinge assembly 10.

Figure 4:
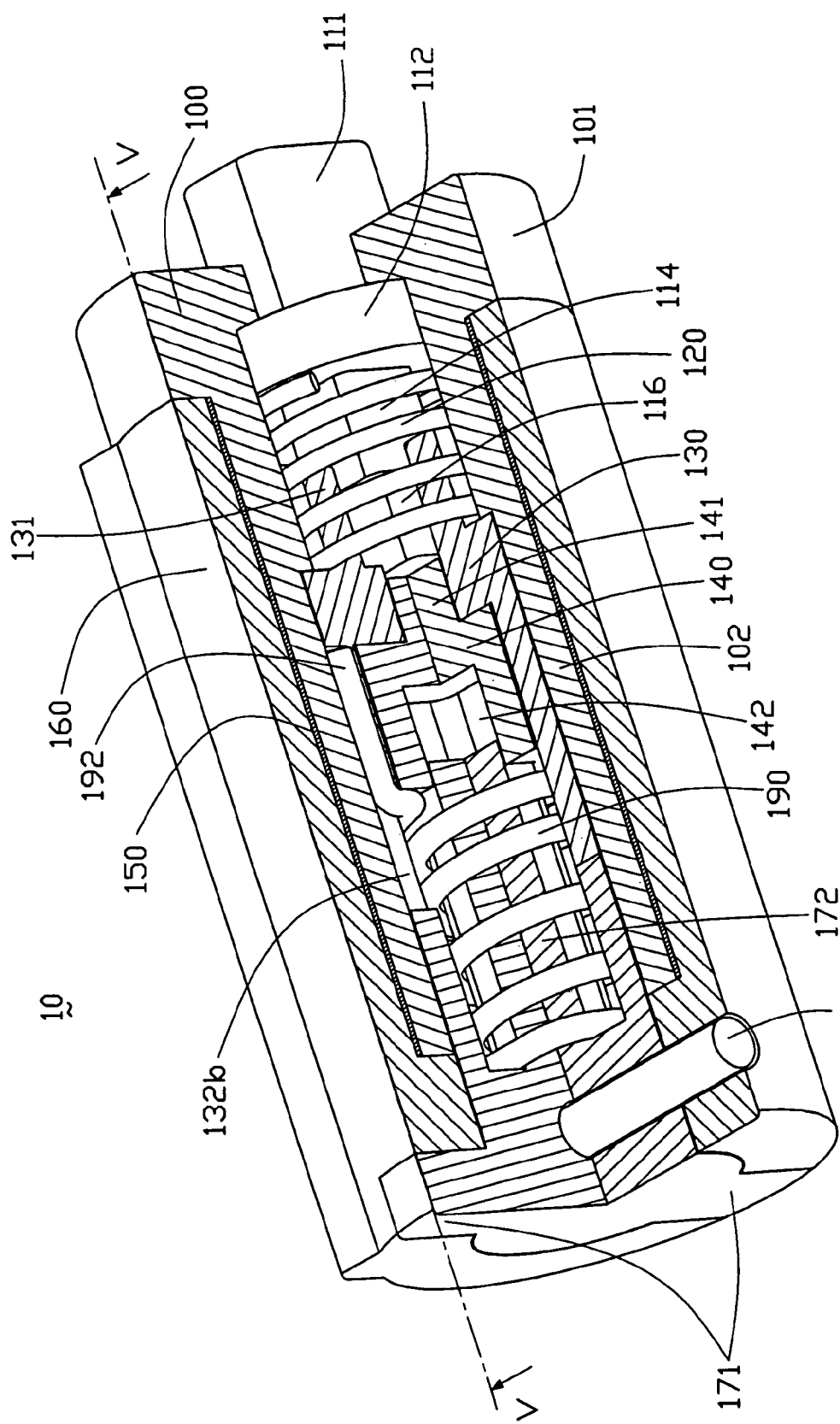
FIG. 4 is an enlarged, assembled, cut-away view of the hinge assembly of FIG. 1, but viewed from another aspect.
Figure 5A:
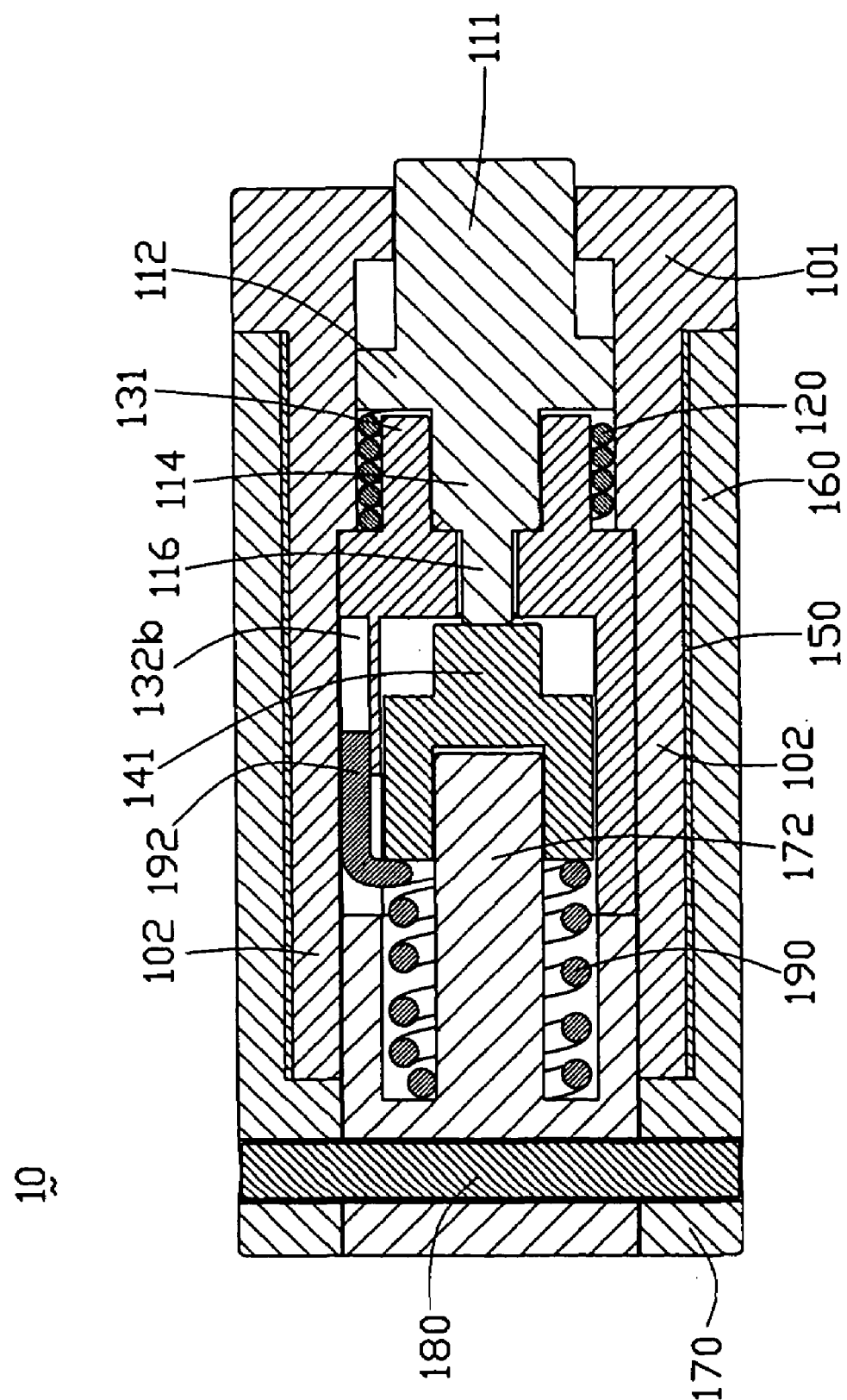
FIG. 5A is a cross sectional view of the hinge assembly of FIG. 4 taken along line V—V thereof, but showing a pressing portion of the hinge assembly depressed, and the hinge assembly in a position corresponding to the cellular phone being in an open state.
Figure 5B:
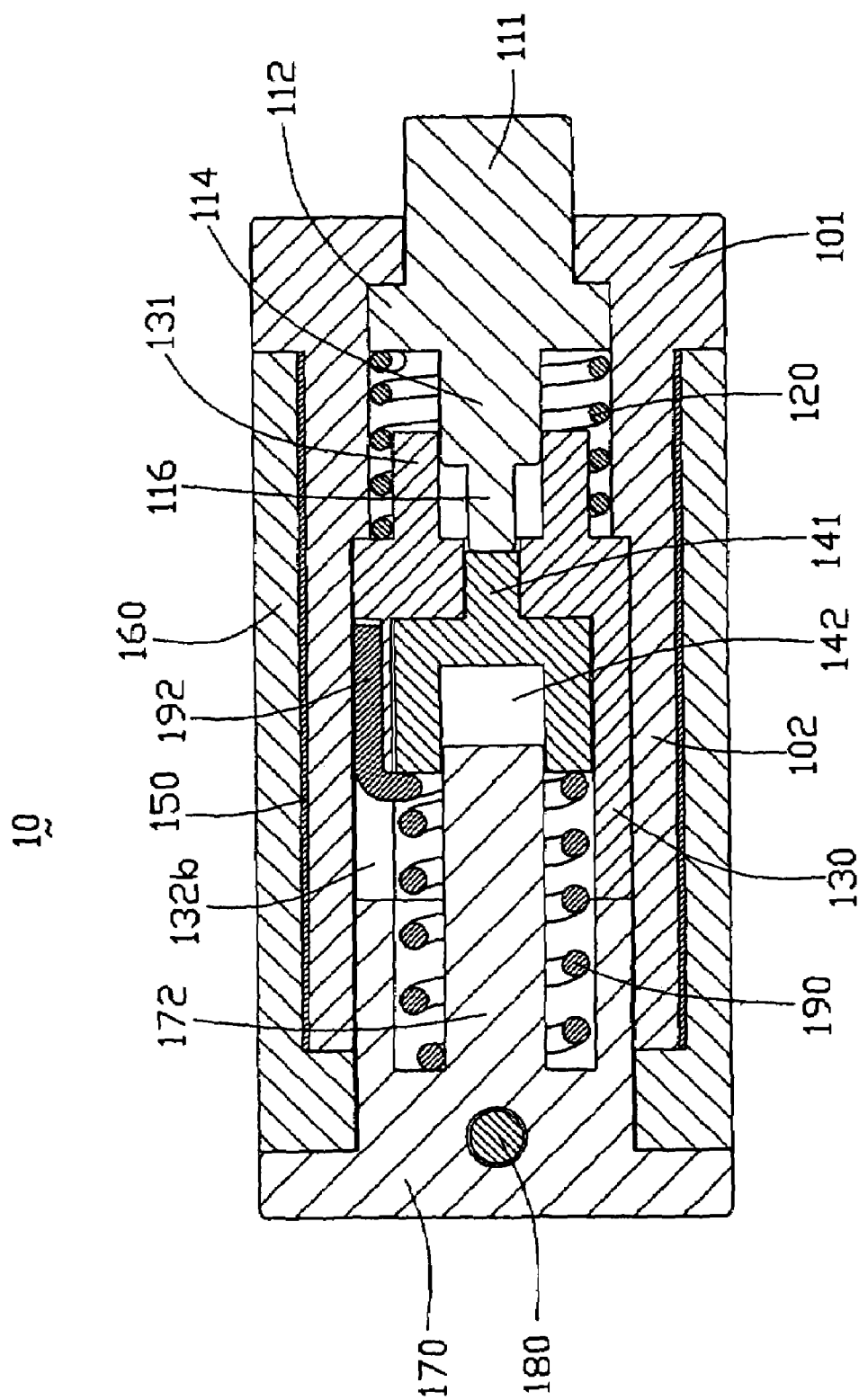
FIG. 5B is a cross sectional view of the hinge assembly of FIG. 4 taken along line V—V thereof, showing the pressing portion in a normal position, and the hinge assembly in a position corresponding to the cellular phone being in a closed state.
Figure 6:
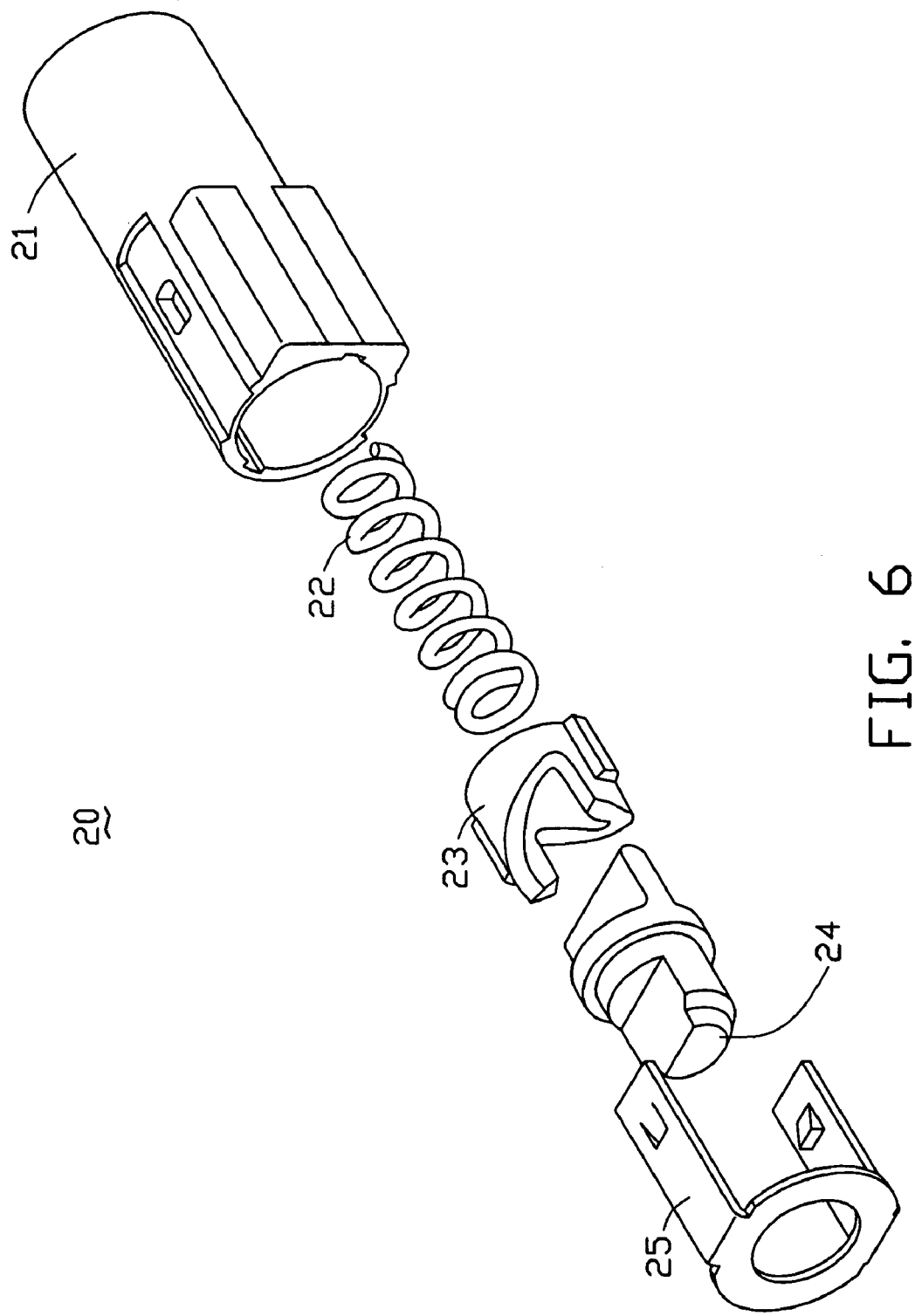
FIG. 6 is an exploded, isometric view of a conventional hinge.

As shown in FIGS. 4 and 5B, when the cover of the cellular phone is in a closed state, the driving peg 116 of the key 110 abuts against the block 141 of the slider 140. The block 141 is in the second chamber 131b of the can 130. The second end 192 of the torsion-bar spring 190 is in the axial slot 132b of the can 130.

Referring also to FIG. 5A, when a user presses on the pressing portion 111, this forces the key 110 to move axially inwardly. The cylindrical portion 112 compresses the pressure spring 120, and the driving peg 116 drives the block 141 axially inside the cavity 132a until the step 114 abuts against an inner stepped surface of the acceptor 132 where the first chamber 131a adjoins the second chamber 131b. The torsion-bar spring 190 is compressed by the slider 140, and drives the axial pole 172 of the fastener 170 to rotate. The fastener 170 drives the slider 140 and the outer housing 160 to rotate in unison, which makes the cover of the cellular phone rotate from the closed state to an open state. Simultaneously, the user releases the pressure spring 120, which decompresses and pushes the key 110 back to its original position. When the cover is in the open state, an angle between the cover and the body of the cellular phone is approximately 180 degrees. The torsion-bar spring 190 drives the outer housing 160 to rotate until stopping means provided on the cover and the body of the cellular phone stop the cover in the open state. As mentioned previously, the cross section of the block 141 is rectangular, so that it can no longer enter the second chamber 131b of the protrusion 131. Because the damper 150 provides friction between the inner housing 100 and the outer housing 160, the rotation of the cover is slowed down. The slow opening of the cover minimizes any jarring of the cover that might otherwise occur, and minimizes inner abrasion of the hinge assembly 10.

When the cover of the cellular phone is moved from the open state to the closed state, the slider 140 rotates in unison with the fastener 170 and the outer housing 160. When the cover reaches the closed state, the block 141 of the slider 140 is aligned with the second chamber 131b of the protrusion 131, and the torsion-bar spring 190 decompresses to drive the block 141 into the second chamber 131b. A peripheral step of the slider 140 where the block 141 adjoins the main body of the slider 140 abuts against an inner step of the can 130 where the second chamber 131b adjoins the cavity 132a. The slider 140 is thus stopped in its original position. The inner housing 100 and the outer housing 160 are back in their original positions, ready for the cover of the cellular phone to be opened again.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A hinge assembly for joining a body and a cover of a foldable electronic device, the hinge assembly comprising:
    an outer housing being a hollow cylinder for being coupled to the cover;
    an inner housing within said outer housing, said inner housing having two ends, one end being open, the other end being a head with a setting hole, wherein said head is coupled to the body;
    a can received in the inner housing, said can having two ends, one end being a protrusion defining a hole, the other end being a cylindrical acceptor;
    a torsion-bar spring received in said inner housing, said torsion-bar spring having opposite first and second ends, the second end of said torsion-bar spring being secured with said can;
    a slider comprising a first end having a block and a second end being a cylinder defining a cavity, said block being engaged in the hole of said can, wherein when said slider axially moves, said block is freed from the hole of said can and is able to rotate relative to said can;
    a securing portion coupled in said cavity of said slider and secured with said outer housing and the first end of said torsion-bar spring; and
    a key received in said setting hole of said inner housing to press said block of said slider.

2. The hinge assembly as claimed in claim 1, further comprising a pressure spring disposed around said protrusion of said can.

3. The hinge assembly as claimed in claim 1, wherein an internal radius of said outer housing is greater than an external radius of said inner housing.

4. The hinge assembly as claimed in claim 1, further comprising a damper, said damper being disposed between said inner housing and said outer housing.

5. The hinge assembly as claimed in claim 4, wherein said damper comprises glue-like material that cannot become hardened.

6. The hinge assembly as claimed in claim 4, wherein said damper comprises dampening oil.

7. The hinge assembly as claimed in claim 1, wherein said securing portion further comprises a fastener, said fastener having a pair of orientation arms, an axial pole and two limiting holes.

8. The hinge assembly as claimed in claim 7, wherein said outer housing defines two cutouts in one end thereof, for securing said orientation arms of said fastener therein.

9. The hinge assembly as claimed in claim 7, wherein said securing portion further comprises an orientation pin joining said outer housing and said fastener.

10. The hinge assembly as claimed in claim 9, wherein said outer housing defines two orientation holes in a peripheral wall thereof, and said orientation pin joins said outer housing and said fastener by extending through said orientation holes and said limiting holes.

11. The hinge assembly as claimed in claim 7, wherein the second end of said torsion-bar spring is bent to form an axial end, and the first end of said torsion-bar spring is shaped to form a generally rectangular configuration fixed around said axial pole of said fastener.

12. The hinge assembly as claimed in claim 11, wherein the acceptor of said can defines a slot in a peripheral wall thereof, and the axial end of said torsion-bar spring is coupled in said slot in order to axially slide therein.

13. The hinge assembly as claimed in claim 1, wherein said hole of said protrusion is a stepped hole which comprises a first chamber and a second chamber, said first and second chambers share a same axis, and a radius of said first chamber is greater than a radius of said second chamber.

14. The hinge assembly as claimed in claim 13, wherein said key is a step-like column which comprises a pressing portion, a cylindrical portion, a step and a driving peg, said pressing portion being generally parallelepiped-shaped to be fittingly received in said setting hole of said inner housing.

15. The binge assembly as claimed in claim 14, wherein said step is shaped to be fittingly received in said first chamber.

16. The hinge assembly as claimed in claim 14, wherein said driving peg is shaped to be movably received in said second chamber.

17. The hinge assembly as claimed in claim 13, wherein said block of said slider has a rectangular cross section, and is shaped to be fittingly received in said second chamber.

18. A hinge assembly for joining a body and a cover of a foldable electronic device, the hinge assembly comprising:
    an outer housing being a hollow cylinder for being coupled to the cover;
    an inner housing within said outer housing, said inner housing having two ends, one end being open, the other end being a head with a setting hole, wherein said head is coupled to the body;
    a can received in the inner housing, said can having two ends, one end being a protrusion defining a hole, the other end being a cylindrical acceptor;
    a pressure spring disposed around said protrusion of said can;
    a torsion-bar spring received in said inner housing, said torsion-bar spring having opposite first and second ends, the second end of said torsion-bar spring being secured with said can;
    a slider comprising a first end having a block and a second end being a cylinder defining a cavity,
    a securing portion coupled in said cavity of said slider and secured with said outer housing and the first end of said torsion-bar spring; and a key received in said setting hole of said inner housing to press said block of said slider.

19. A hinge assembly for joining a body and a cover of a foldable electronic device, the hinge assembly comprising:
- a can being only linearly moveble;
- a fastener being only rotatably moveable;
- a torsion plus compression spring having two opposite ends respectively restricted at the can and the fastener; and
- a slider abutting against the spring; wherein
- when said slider is axially moved to a first axial position to compress the spring, one end of said slider is released from the can so as to allow the fastener with the associated said slider to be rotated by means of a biasing force generated by the spring; and when said slider is axially moved to a second axial position and engaged with the can, the spring is relaxed axially but tensioned rotatably.

20. The binge assembly as claimed in claim 19, wherein the end of the spring restricted at the can is moveable axially.

* * * * *